United States Patent
Lin et al.

(10) Patent No.: US 9,621,027 B2
(45) Date of Patent: Apr. 11, 2017

(54) POWER SUPPLIES AND CONTROL METHODS CAPABLE OF IMPROVING POWER FACTOR DURING LIGHT LOAD

(71) Applicant: Leadtrend Technology Corporation, Hsinchu (TW)

(72) Inventors: Chang-Yi Lin, Zhubei (TW); Yi-Chuan Tsai, Kaohsiung (TW)

(73) Assignee: LEADTREND TECHNOLOGY CORPORATION, Hsinchu (TW)

( * ) Notice: Subject to any disclaimer, the term of this patent is extended or adjusted under 35 U.S.C. 154(b) by 137 days.

(21) Appl. No.: 14/478,955

(22) Filed: Sep. 5, 2014

(65) Prior Publication Data
US 2015/0069979 A1    Mar. 12, 2015

(30) Foreign Application Priority Data
Sep. 6, 2013 (TW) .............................. 102132129 A

(51) Int. Cl.
*H02M 1/42*    (2007.01)
*H02M 1/00*    (2006.01)

(52) U.S. Cl.
CPC ........... *H02M 1/4225* (2013.01); *H02M 1/42* (2013.01); *H02M 1/4208* (2013.01); *H02M 2001/0032* (2013.01); *Y02B 70/126* (2013.01); *Y02B 70/16* (2013.01)

(58) Field of Classification Search
CPC ..... H02M 1/42; H02M 1/4208; H02M 1/4225
See application file for complete search history.

(56) References Cited

U.S. PATENT DOCUMENTS

| | | | | |
|---|---|---|---|---|
| 5,991,172 A | * | 11/1999 | Jovanovic | H02M 1/4258 363/132 |
| 6,359,426 B1 | * | 3/2002 | Sarles | H02M 1/4208 323/281 |
| 7,016,204 B2 | * | 3/2006 | Yang | H02M 3/33507 363/21.13 |
| 7,414,865 B2 | * | 8/2008 | Yang | H02M 3/33523 363/21.07 |
| 7,492,613 B2 | * | 2/2009 | Yang | H02M 3/33523 363/21.01 |
| 7,616,461 B2 | * | 11/2009 | Yang | H02M 1/32 363/21.01 |
| 8,094,468 B2 | | 1/2012 | Yang et al. | |

(Continued)

FOREIGN PATENT DOCUMENTS

CN    101488714 A    7/2009

*Primary Examiner* — Timothy J Dole
*Assistant Examiner* — Ishrat Jamali
(74) *Attorney, Agent, or Firm* — McClure, Qualey & Rodack, LLP

(57) ABSTRACT

An apparatus is capable of improving the power factor of a power supply powered by a high power line and a ground power line. The apparatus comprises a line voltage detector and an ON time controller. The line voltage detector provides a scaled voltage to represent a line voltage of the high power line. The ON time controller has a valley voltage detector, which provides, in response to the scaled voltage, a valley representative representing a valley voltage of the line voltage. The ON time controller controls an ON time of a power switch in the power supply in response to the valley representative.

20 Claims, 7 Drawing Sheets

(56) References Cited

U.S. PATENT DOCUMENTS

| | | | | |
|---|---|---|---|---|
| 8,213,192 B2* | 7/2012 | Konecny | ........... | H02M 3/33515 363/21.13 |
| 8,432,109 B2* | 4/2013 | Yang | ................. | H05B 33/0815 315/212 |
| 2010/0308733 A1* | 12/2010 | Shao | ................... | H02M 1/4225 315/119 |
| 2010/0315062 A1* | 12/2010 | Hung | ................. | G01R 19/0084 324/102 |
| 2012/0057375 A1* | 3/2012 | Yang | ................. | H02M 3/33523 363/21.12 |
| 2015/0048807 A1* | 2/2015 | Fan | ........................ | H02M 1/42 323/208 |

* cited by examiner

POWER SUPPLIES AND CONTROL METHODS CAPABLE OF IMPROVING POWER FACTOR DURING LIGHT LOAD

CROSS-REFERENCE TO RELATED APPLICATION

This application claims priority to and the benefit of Taiwan Application Series Number 102132129 filed on Sep. 6, 2013, which is incorporated by reference in its entirety.

BACKGROUND

The present disclosure relates generally to apparatuses and control methods for power factor correction, more particularly to apparatuses and control methods for improving the power factor when a power supply drives a light load.

The power factor of an AC electrical power system is defined as the ratio of the real power flowing to a load, to the apparent power into the power circuit, and is a dimensionless number between −1 and 1. If a power supply has a power factor less than 1, an electric power company must reserve power delivery capacity more than the output power rating of the power supply, to make the power supply operate properly in all allowed circumstances. In order to relieve the burden of reserving over-high power delivery capacity, developed and developing countries have enforced regulations requiring power supplies for lighting or with more than 100 Watt output rating to have a power factor more than 0.9.

Active power factor correction (PFC) refers to use of active devices including a control circuit and at least one power switch for achieving a good power factor. Normally, one power switch is well controlled to intentionally drain an input current, making its average substantially in proportion to an input voltage, such that a power factor of 1 could be approximately achieved. Active PFC is commonly embodied by switching-mode power supplies (SMPSs). A booster operating in a constant ON-time scheme, for example, could results in a very high power factor.

A SMPS normally has an anti-EMI (electromagnetic inference) circuit, which usually includes a low-pass filter comprising an inductor and a capacitor at least, and is positioned between a main converter and an outlet plug connected to AC main power lines. When driving a light load or no load, the SMPS drains very little current from the outlet plug, and the main converter might receive a filtered input voltage very different from the input voltage in the outlet plug. As a result, even if the main converter makes its average input current substantially in proportion to the filtered input voltage, the power factor of the SMPS is not optimized because the waveform of the average input current still differs to that of the filtered input voltage in shape.

Therefore, it is an issue to optimize the power factor of a SMPS when driving a light load.

SUMMARY

Embodiments of the invention include an apparatus capable of improving power factor of a power supply powered by a high power line and a ground power line. The power supply comprises a power switch connected to an inductive device. The apparatus comprises a line voltage detector and an ON time controller. The line voltage detector provides a scaled voltage to represent a line voltage of the high power line. The ON time controller has a valley voltage detector, which provides, in response to the scaled voltage, a valley representative representing a valley voltage of the line voltage. The ON time controller controls an ON time of the power switch in response to the valley representative.

Embodiments of the invention further include a control method for improving a power factor of a power supply, which is powered by a high power line and a ground power line. The power supply comprises a power switch. A scaled voltage is provided to represent a line voltage of the high power line. A valley representative is provided, in response to the scaled voltage, to represent a valley voltage of the line voltage. An ON time of the power switch is controlled in response to the scaled voltage and the valley representative.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
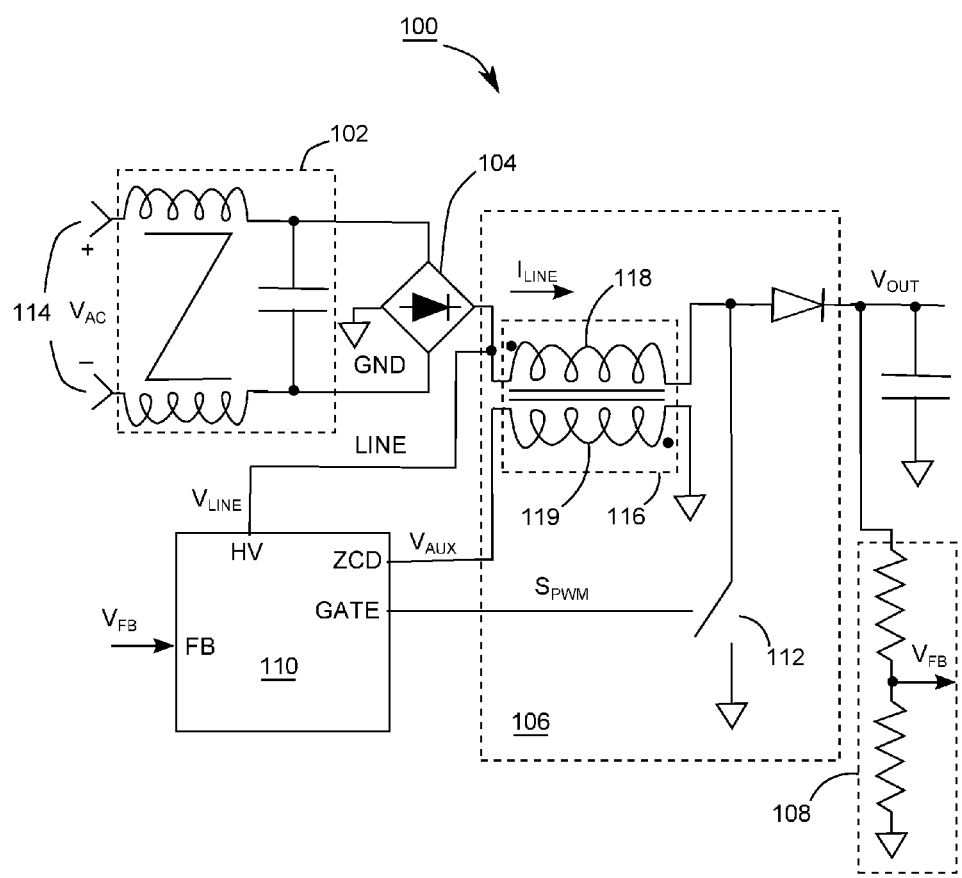
FIG. 1 demonstrates a SMPS with PFC according to embodiments of the invention.

FIG. 1 demonstrates a SMPS with PFC according to embodiments of the invention, including an anti-EMI circuit 102, a bridge rectifier 104, a booster 106, and a controller 110.

The anti-EMI circuit 102 has inductors and a capacitor, to block any high-frequency signal from propagating from the booster 106 to an AC input port 114, an outlet plug for example, where the high-frequency signal could occur due to the high-frequency switching of the power switch 112. The AC input port 114 receives an AC input voltage $V_{AC}$. The bridge rectifier 104 rectifies its AC inputs and generates a direct-current voltage across between a high power line LINE and a ground line GND. The voltage at the high power line LINE is denoted as line voltage $V_{LINE}$, and the voltage at the ground line is about zero by definition. The line voltage $V_{LINE}$ is a filtered voltage result as the anti-EMI circuit 102 low-passes the AC input voltage $V_{AC}$. The current flowing from the bridge rectifier 104 into the primary winding 118 is denoted as line current $V_{LINE}$. The booster 106 includes the primary winding 118 and the power switch 112, and they are connected in series and between the high power line LINE and the ground power line GND. The auxiliary winding 119 (of the transformer 116) is coupled to a terminal ZCD (named from zero current detection) of the controller 110. The terminal ZCD might be a pin if the controller 110 is a packaged integrated circuit. A voltage-divider 108 provides a feedback voltage $V_{FB}$ representing an output voltage $V_{OUT}$ of the booster 106. The controller 110, in response to the feedback voltage $V_{FB}$, the line voltage $V_{LINE}$, and signals delivered from the auxiliary winding 119, generates a pulse-width-modulation (PWM) signal $S_{PWM}$ to a gate terminal GATE to periodically turn ON and OFF the power switch 112.

The purpose of the controller 110 is to stabilize the feedback voltage $V_{FB}$ at a target voltage $V_{TAR}$, such that the output voltage is stable. As to PFC, the controller 110, at the same time, is designed to make an average of the line current $I_{LINE}$ proportional to the AC input voltage $V_{AC}$, thereby optimizing the power factor.

Figure 2:
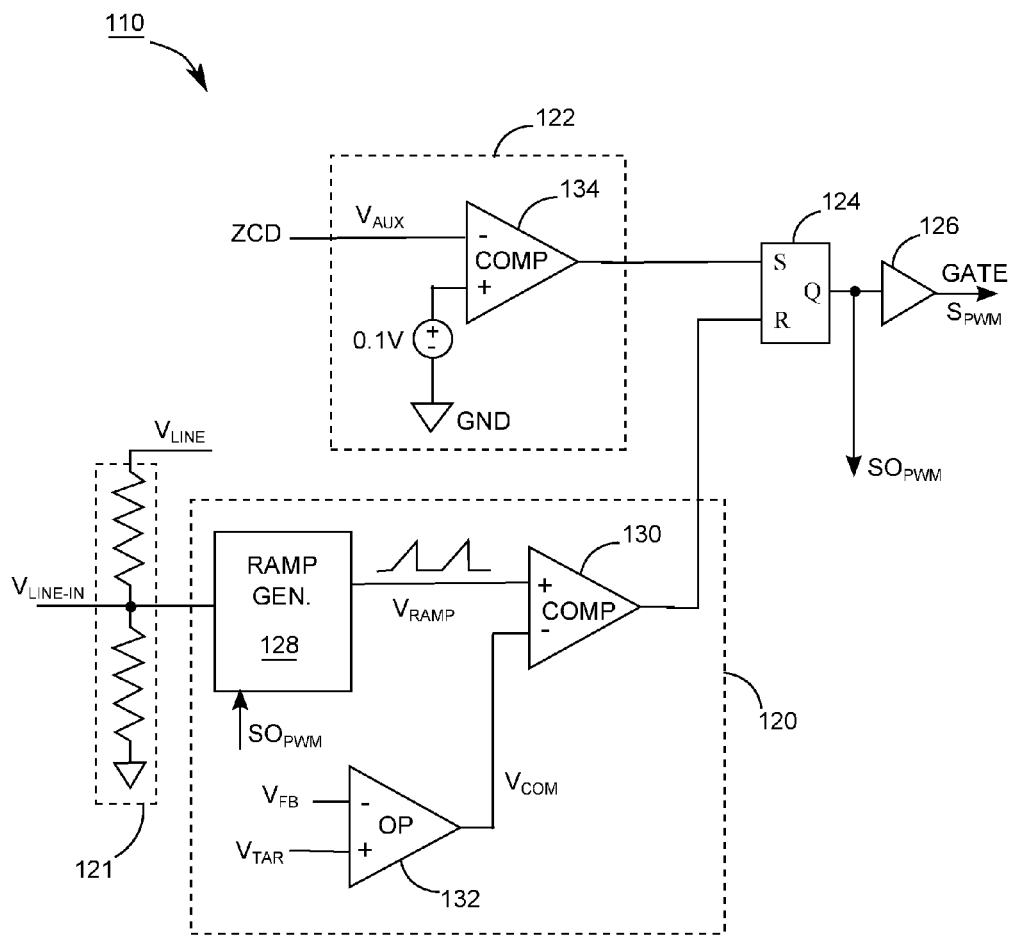
FIG. 2 illustrates the controller in FIG. 1.

FIG. 2 illustrates the controller 110 in FIG. 1, including a voltage-divider 121, an ON time controller 120, an OFF time controller 122, an SR flip-flop 124, and driver 126. The voltage-divider 121 scales down the line voltage $V_{LINE}$, which could be as high as 240V, to generate a scaled voltage $V_{LINE-IN}$, whose voltage is below 40V and is acceptable by the ON time controller 120. The ON time controller 120 can reset the SR flip-flop 124, to turn OFF the power switch 112 via the driver 126, therefore giving an end to an ON time $T_{ON}$ of the power switch 112. The OFF time controller 122 can set the SR flip-flop 124, to turn ON the power switch 113, therefore giving an end to an OFF time $T_{OFF}$ and a beginning to an ON time $T_{ON}$.

The ON time controller 120 has a ramp generator 128, a comparator 130, and an operational amplifier 132. The ramp generator 128 generates a ramp voltage $V_{RAMP}$ in response to the scaled voltage $V_{LINE-IN}$ and the PWM signal $SO_{PWM}$ output from the SR flip-flop 124. Based on the difference between the target voltage $V_{TAR}$ and the feedback voltage $V_{FB}$, the operational amplifier 132 provides in its output a compensation voltage $V_{COM}$. Starting from the beginning of the ON time $T_{ON}$, the ramp voltage $V_{RAMP}$ ramps up with a slope from a default value. Once the ramp voltage $V_{RAMP}$ exceeds the compensation voltage $V_{COM}$, the comparator 130 resets the SR flip-flop 124, so both the PWM signals $SO_{PWM}$ and $S_{PWM}$ become "0" in logic to turn off the power switch 112 and end an ON time $T_{ON}$. The dependence of the ramp voltage $V_{RAMP}$ to both the scaled voltage $V_{LINE-IN}$ itself and a local minimum of the scaled voltage $V_{LINE-IN}$ will be detail later. The scaled voltage $V_{LINE-IN}$ represents the line voltage $V_{LINE}$, and accordingly a local minimum of the scaled voltage $V_{LINE-IN}$ represents a valley voltage $V_{VALLEY}$ of the line voltage $V_{LINE}$. In one embodiment of the invention, the higher scaled voltage $V_{LINE-IN}$ the higher slope of the ramp voltage $V_{RAMP}$; and the higher local minimum of the scaled voltage $V_{LINE-IN}$ the lower slope of the ramp voltage $V_{RAMP}$.

The OFF time controller 122 acts like a de-energization detector. When the electromagnetic energy stored in the transformer 116 (of FIG. 1) is depleted or the line current $I_{LINE}$ drops to zero, the auxiliary voltage $V_{AUX}$ at the terminal ZCD starts oscillating. After an ON time $T_{ON}$ ends, the first time when the voltage $V_{AUX}$ drops across a reference voltage (which shown in FIG. 2 is 0.1V) indicates that the transformer 116 has depleted its stored energy, so in response the comparator 134 sets the SR flip-flop 124 to make the PWM signals $SO_{PWM}$ and the $S_{PWM}$ both "1" in logic, and the power switch 112 is turned ON, claiming the beginning of the next ON time $T_{ON}$.

Figure 3:
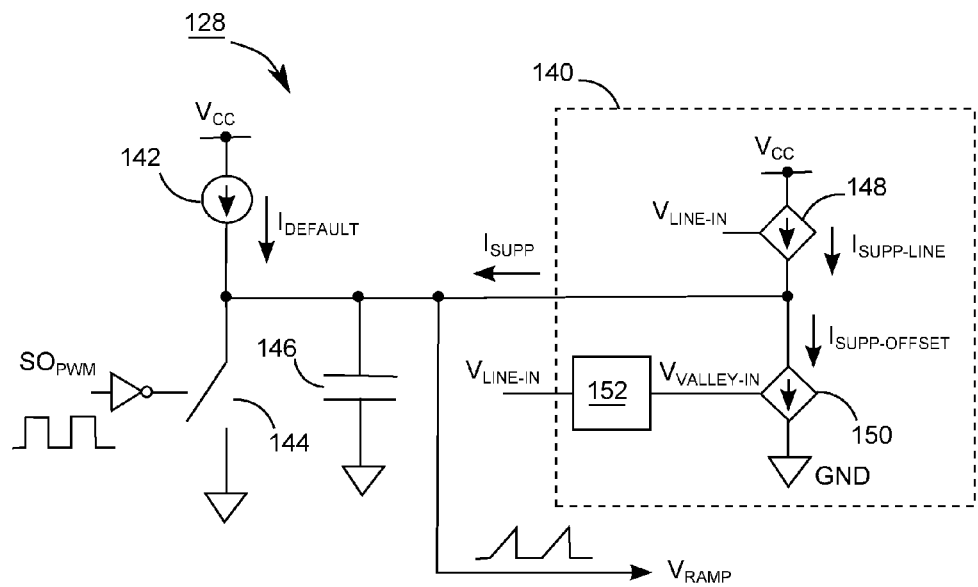
FIG. 3 shows the ramp generator in FIG. 2.

FIG. 3 shows the ramp generator 128 in FIG. 2. The switch 144 is under the control of the PWM signal $SO_{PWM}$. During an ON time $T_{ON}$, the switch 144 performs an open circuit, the main constant current source 142 provides a constant current $I_{DEFAULT}$ to charge the capacitor 146, so the ramp voltage $V_{RAMP}$ increases over time and its waveform has a slope. During an OFF time $T_{OFF}$, the switch 144 performs a short circuit, and the ramp voltage $V_{RAMP}$ is clamped to be as 0V, a ground voltage. A supplemental current source 140 provides a supplemental current $I_{SUPP}$, and includes two voltage-controlled current sources 148 and 150, and a valley voltage detector 152. The valley voltage detector 152 provides a scaled valley voltage $V_{VALLEY-IN}$, which is a scaled version of the valley voltage $V_{VALLEY}$ of the line voltage $V_{LINE}$. The voltage-controlled current source 148 generates charge current $I_{SUPP-LINE}$ in response to the scaled voltage $V_{LINE-IN}$, while the voltage-controlled current source 148 generates discharge offset current $I_{SUPP-OFFSET}$ in response to the scaled valley voltage $V_{VALLEY-IN}$. Accordingly, the slope of the ramp voltage $V_{RAMP}$ increases if the scaled voltage $V_{LINE-IN}$ becomes higher, but decreases if the scaled valley voltage $V_{VALLEY-IN}$ increases.

Preferably, the constant current $I_{DEFAULT}$ is considerably much more than the supplemental current $I_{SUPP}$, the ON time $T_{ON}$ is roughly a constant, and the booster 106 in FIG. 1 substantially operates at a constant ON-time mode, whose excellency in power factor correction has been approved in the art. Derivable from FIG. 2, the length of an ON time $T_{ON}$ is determined by the compensation voltage $V_{COM}$ and the slope of the ramp voltage $V_{RAMP}$. Since the supplemental current $I_{SUPP}$ slightly adjusts the slope of the ramp voltage $V_{RAMP}$, it also changes the ON time $T_{ON}$ mildly. If the line voltage $V_{LINE}$ increases, both the scaled voltage $V_{LINE-IN}$ and the charge current $I_{SUPP-LINE}$ raise, and the slope increases, so the ON time $T_{ON}$ shortens. If the valley voltage $V_{VALLEY}$ of the line voltage $V_{LINE}$ increases, the scaled valley voltage $V_{VALLEY-IN}$ becomes higher, the discharge offset current $I_{SUPP-OFFSET}$ increases, the slope decreases, so the ON time $T_{ON}$ lengthens.

Figure 4:
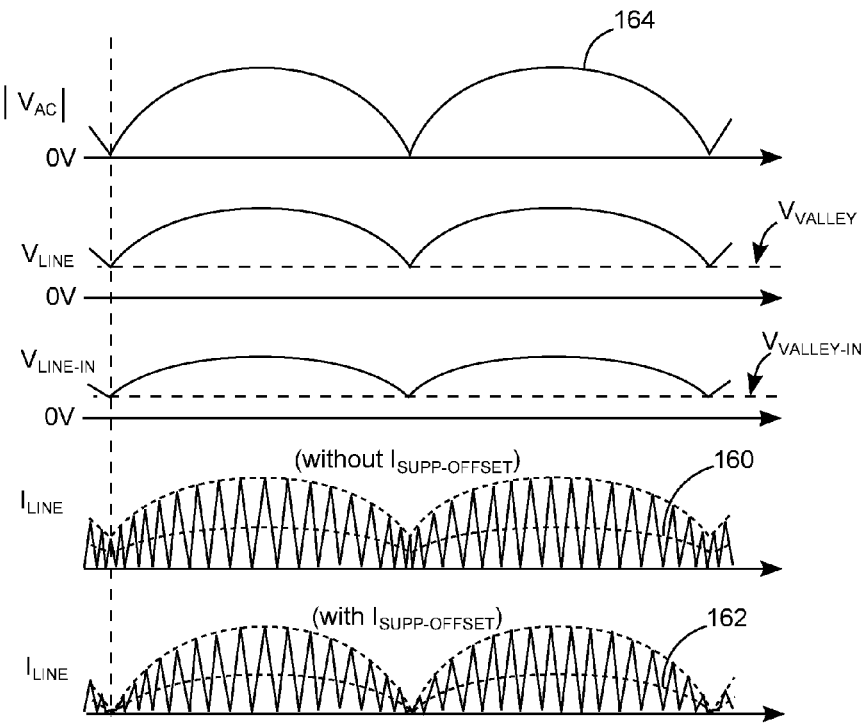
FIG. 4 demonstrates some waveforms of signals according to an embodiment of the invention.

FIG. 4 demonstrates some waveforms of signals according to an embodiment of the invention, including, from top to bottom, the absolute of the AC input voltage $V_{AC}$, the line voltage $V_{LINE}$ and the valley voltage $V_{VALLEY}$ when an output load is light, the scaled voltage $V_{LINE-IN}$ and the scaled valley voltage $V_{VALLEY-IN}$, the line current $I_{LINE}$ if there is no supplemental current $I_{SUPP}$ provided, and the line current $I_{LINE}$ if the supplemental current $I_{SUPP}$ is provided.

As demonstrated in FIG. 4, the absolute of the AC input voltage $V_{AC}$ is always positive and its valleys all are 0V. When the load of the booster 106 is light or absent, the local minimum of the line voltage $V_{LINE}$ might not go down to 0V because the booster 106 could not deplete the charge in the capacitor of the anti-EMI circuit 102 every half cycle of the AC input voltage $V_{AC}$. So the valley voltage $V_{VALLEY}$, the local minimum of the line voltage $V_{LINE}$, stays somewhere above zero. The scaled voltage $V_{LINE-IN}$ is a scaled version of the line voltage $V_{LINE}$, such that it has the waveform similar to the line voltage $V_{LINE}$, as demonstrated in FIG. 4. Supposed that the discharge offset current $I_{SUPP-OFFSET}$ in FIG. 3 is absent, the line current $I_{LINE}$ still goes up and down in response to the ON and OFF of the power switch 112, and the average of the line current $I_{LINE}$ mainly follows the waveform of the line voltage $V_{LINE}$, which, as shown in the second diagraph of FIG. 4, is nevertheless very different to that of the absolute of the AC input voltage $V_{AC}$. If the discharge offset current $I_{SUPP-OFFSET}$ in FIG. 3 is provided as some embodiments of the invention do, it will take away the charge current $I_{SUPP-LINE}$ when the line voltage $V_{LINE}$ is at its valleys, and the average of the line current $I_{LINE}$ will follow the line voltage $V_{LINE}$ minus the valley voltage $V_{VALLEY}$, as shown by the last diagraph in FIG. 4. It also can be derived from FIG. 4 that the waveform 162, the average of the line current $I_{LINE}$ under the help of discharge offset current $I_{SUPP-OFFSET}$, fits the waveform of the absolute of the AC input voltage $V_{AC}$, better than the waveform 160, the average of the line current $I_{LINE}$ without the help of discharge offset current $I_{SUPP-OFFSET}$, does. In other words, the existence of the discharge offset current $I_{SUPP-OFFSET}$ improves the power factor when the booster 106 powers a light load or no load.

If the load of the booster 106 is heavy, the charge stored in the capacitor of the anti-EMI circuit 102 can be easily depleted by strong line current $I_{LINE}$, and the valley voltage $V_{VALLEY}$ will be very close to 0V, so the discharge offset current $I_{SUPP-OFFSET}$ is almost zero. In other words, since the discharge offset current $I_{SUPP-OFFSET}$ almost disappears when a heavy load is driven, the embodiment shown FIGS. 1 to 3 will have the same power factor as it was without the introduction of the discharge offset current $I_{SUPP-OFFSET}$.

Figure 5A:
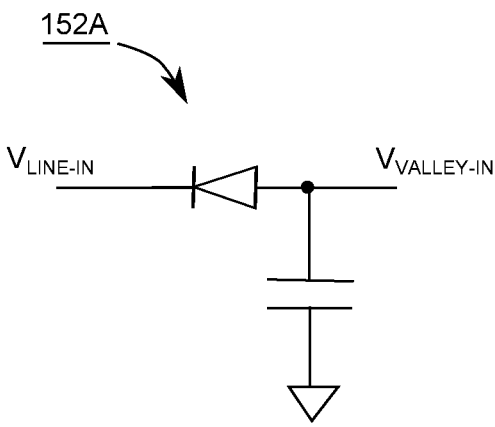
FIGS. 5A and 5B demonstrate two valley voltage detectors.
Figure 5B:
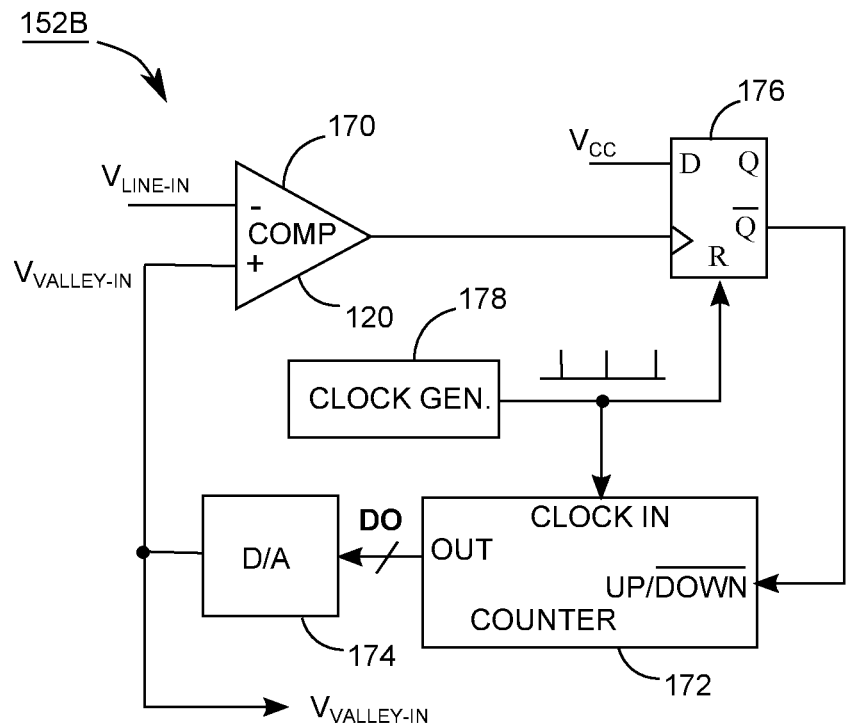

FIG. 5A demonstrates a valley voltage detector 152A, suitable for use in FIG. 3. The valley voltage detector 152A has a diode and a capacitor, and the voltage on the capacitor could be used as the scaled valley voltage $V_{VALLEY-IN}$. The capacitor in the valley voltage detector 152A should excel in resisting leakage, to hold the scaled valley voltage $V_{VALLEY-IN}$ constantly, and might be costly in view of implementation. FIG. 5B shows another valley voltage detector 152B, where a digital counter 172 outputs a count DO, which is converted by a digital-to-analog converter 174 into the scaled valley voltage $V_{VALLEY-IN}$, an analog signal. The count DO seems to be a digitalized valley voltage, memorized and held by the counter 172. The clock generator 178 provides a pulse every period of time to reset the D flip-flop 176 and make the counter 172 count up or down, depending on the output from the D flip-flop 176. The period of time to issue the pulse should be not less than a cycle time of the waveform 164 shown in FIG. 2. Preferably, the period of time is not less than 8 ms. The output of the comparator 170 connects to the clock terminal of the D flip-flop 176. Simply put, in one period of time defined by the clock generator 178, if the scaled voltage $V_{LINE-IN}$ never drops below the scaled valley voltage $V_{VALLEY-IN}$, then the non-inverted output terminal Q is always held to output "0", otherwise it outputs "1" before the beginning of a next period of time. In case that the scaled voltage $V_{LINE-IN}$ is always above the scaled valley voltage $V_{VALLEY-IN}$, it means the real valleys of the scaled voltage $V_{LINE-IN}$ are all above the scaled voltage $V_{LINE-IN}$, so at the beginning of the next period of time the "1" at the inverted output terminal Q-bar of the D flip-flop 176 makes the counter 172 count up, and the scaled voltage $V_{LINE-IN}$ increases by a little bit to trace the real valleys of the scaled voltage $V_{LINE-IN}$. In the opposite, if the scaled voltage $V_{LINE-IN}$ has dropped across the scaled valley voltage $V_{VALLEY-IN}$, it means the valleys of the scaled voltage $V_{LINE-IN}$ have values somewhere below the scaled valley voltage $V_{VALLEY-IN}$, the counter counts down at the beginning of the next period of time, so as to decrease the scaled valley voltage $V_{VALLEY-IN}$ and to trace the valleys. As the time goes by, the scaled valley voltage $V_{VALLEY-IN}$ will have about the value representing the valleys.

Figure 6:
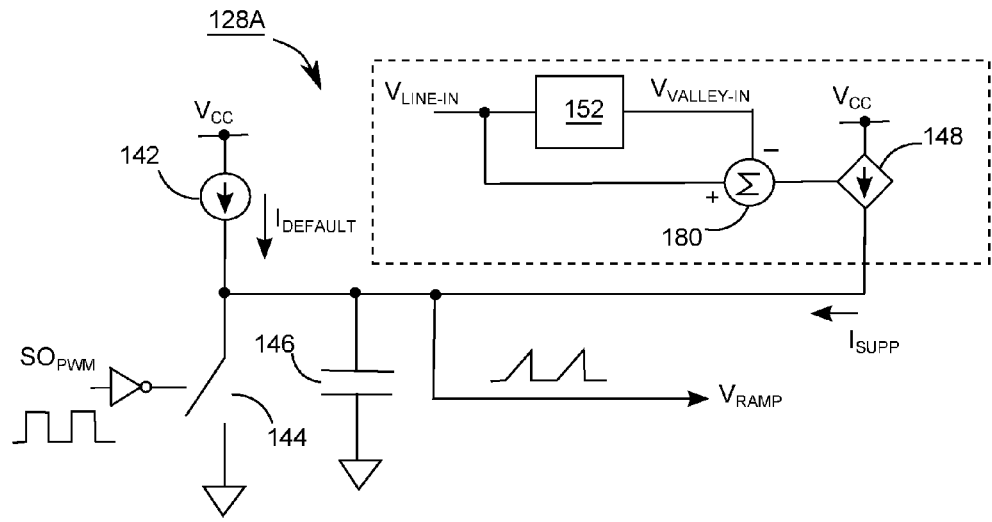
FIG. 6 demonstrates another ramp generator.

FIG. 6 demonstrates another ramp generator 128A, similar with the ramp generator 128 in FIG. 3 and suitable for use in FIG. 2. Similarly, the valley voltage detector 152 in FIG. 6 provides a scaled valley voltage $V_{VALLEY-IN}$ to the adder 180 as a deduction from the scaled voltage $V_{LINE-IN}$. After deduction, the adder 180 provides the remainder to the voltage-controlled current source 148, which accordingly outputs the supplemental current $I_{SUPP}$ to charge the capacitor 146.

This invention is not limited to use for a booster. It could be employed in a flyback converter, for example, as demonstrated by the power supply 200 in FIG. 7. The power supply 200 includes an anti-EMI circuit 102, a bridge rectifier 104, a flyback converter 202, a voltage divider 208, and a controller 210.

The voltage divider 208 consists of two resistors connected in series between two ends of the auxiliary winding 119, and is capable of providing a scaled version of the auxiliary voltage $V_{AUX}$ to the terminal ZCD of the controller 210. The controller 210 generates the PWM signal $S_{PWM}$ to turn ON or turn OFF the power switch 212. During an ON time $T_{ON}$ when the power switch 212 is ON, the primary winding 118 of the transformer energizes; and during an OFF time $T_{OFF}$ when the power switch 212 is OFF, the transformer de-energizes and releases, via the auxiliary winding 119 and the secondary winding 201, the electromagnetic energy stored therein.

Figure 7:
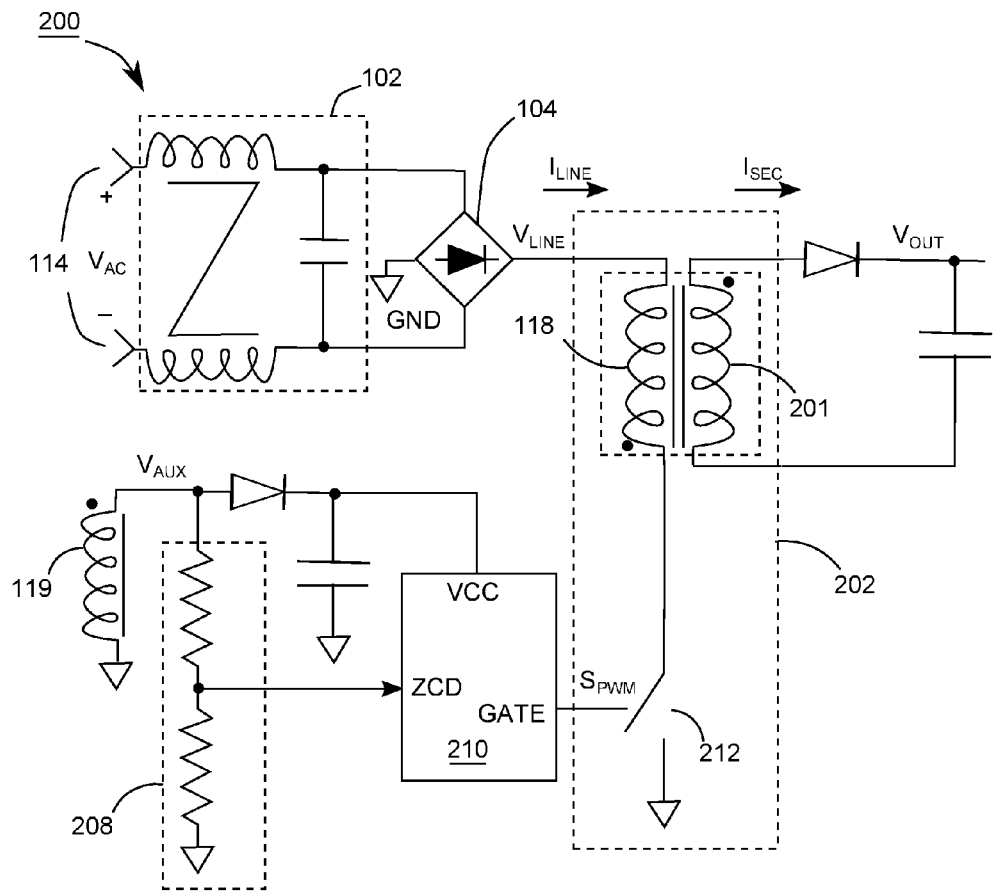
FIG. 7 demonstrates another SMPS according to embodiments of the invention.
Figure 8:
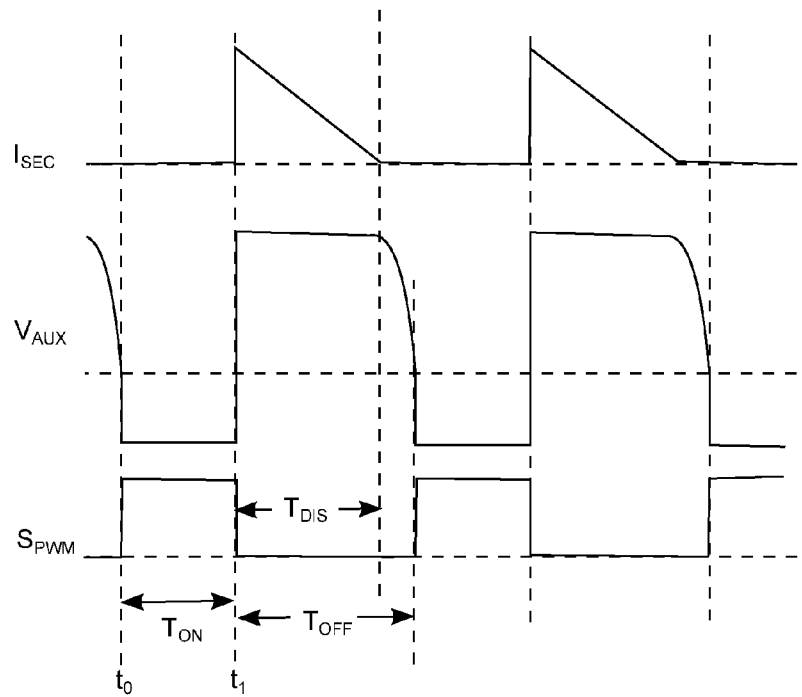
FIG. 8 shows waveforms of the secondary current $I_{SEC}$ through the secondary winding, the auxiliary voltage $V_{AUX}$, and the PWM signal $S_{PWM}$ in FIG. 7.

FIG. 8 shows waveforms of the secondary current $I_{SEC}$ through the secondary winding 201, the auxiliary voltage $V_{AUX}$, and the PWM signal $S_{PWM}$ in FIG. 7. During an ON time $T_{ON}$, the auxiliary voltage $V_{AUX}$ is a negative reflective voltage in proportion to the line voltage $V_{LINE}$; and during an OFF time $T_{OFF}$, it is a positive reflective voltage substantially in proportion to the output voltage $V_{OUT}$.

Figure 9:
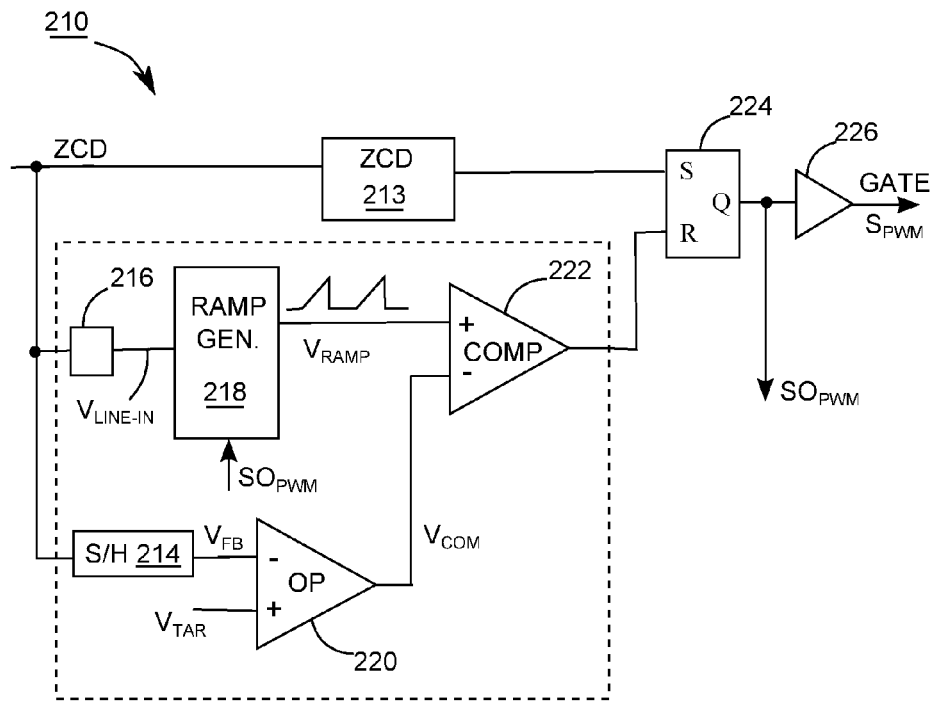
FIG. 9 demonstrates the controller 210 in FIG. 7.

FIG. 9 demonstrates the controller 210 in FIG. 7. An OFF time controller 213 acts like a de-energization detector, and deems the secondary winding 213 as having depleted its own electromagnetic energy when the voltage $V_{Aux}$ drops across a reference voltage (which is 0.1 for example). The OFF time controller 213 accordingly sets the SR flip-flop 224 to make the PWM signals $SO_{PWM}$ and the $S_{PWM}$ both "1" in logic, and the power switch 212 is turned ON, claiming the beginning of an ON time $T_{ON}$, as what happens at time point $t_0$ of FIG. 8.

During the discharge time $T_{DIS}$, which is the period of time when the secondary current $I_{SEC}$ is not 0, the sampling circuit 214 in FIG. 9 samples the scaled version of the auxiliary voltage $V_{AUX}$ and holds the sampled result as a feedback voltage $V_{FB}$. The operational amplifier 220 compares the feedback voltage $V_{FB}$ and a target voltage $V_{TAR}$, and generates a compensation voltage $V_{COM}$ based on the difference between them. The ramp generator 218 generates a ramp voltage $V_{RAMP}$ in response to the scaled voltage $V_{LINE-IN}$ and the PWM signal $SO_{PWM}$ output from the SR flip-flop 224. At the beginning of an ON time $T_{ON}$, the ramp voltage $V_{RAM}$ increases with a slope from a default value. At time point $t_1$ of FIG. 8, the ramp voltage $V_{RAMP}$ exceeds the compensation voltage $V_{COM}$, such that the comparator 222 resets the SR flip-flop 224 and makes both the PWM signals $SO_{PWM}$ and $S_{PWM}$ "0", turning OFF the power switch 212 and giving an end to an ON time $T_{ON}$. Examples of the ramp generator 218 has been illustrated in FIGS. 3 and 6, teaching of which has detailed how the slope of the ramp voltage $V_{RAMP}$ is in response to the scaled voltage $V_{LINE-IN}$ and the scaled valley voltage $V_{VALLEY-IN}$.

Figure 10:
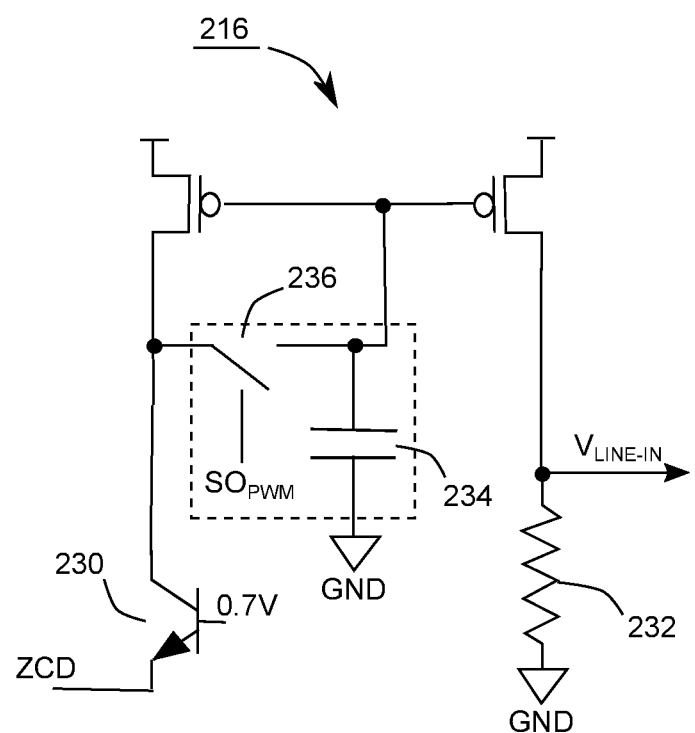
FIG. 10 illustrates the line voltage detector 216 in FIG. 9.

During an ON time $T_{ON}$ in FIG. 8, the line voltage detector 216 of FIG. 9 clamps the voltage at the terminal ZCD at about 0V, and senses the current drained out from the terminal ZCD to generate the scaled voltage $V_{LINE-IN}$, which is representative to the line voltage $V_{LINE}$. FIG. 10 illustrates the line voltage detector 216 in FIG. 9, and includes a bipolar junction transistor (BJT) 230 with its base electrode clamped at 0.7V. Accordingly, the BJT 230 could provide abundant current to clamp its emitter electrode at 0V, and this abundant current will be in proportion to the line voltage $V_{LINE}$. A current mirror provides a mirror current to flow through the resistor 232 and to generate the scaled voltage $V_{LINE\text{-}IN}$ across the resistor 232, such that the mirror current and the scaled voltage $V_{LINE\text{-}IN}$ as well are in proportion to the line voltage $V_{LINE}$. In other words, the scaled voltage $V_{LINE\text{-}IN}$ is capable of representing the line voltage $V_{LINE}$. A capacitor 234 and a switch 236 are for holding the line voltage information during an OFF time $T_{OFF}$. Even though the current drained out from the BJT 230 will become zero during an OFF time $T_{OFF}$ when the switch 236 is turned OFF, the capacitor 234, as being isolated from the BJT 230, holds the gate voltages of the PMOS transistors in the current mirror, such that the current mirror is able to continue providing the mirror current and to build up the scaled voltage $V_{LINE\text{-}IN}$. Therefore, the scaled voltage $V_{LINE\text{-}IN}$ shows no matter it is during an ON time $T_{ON}$ or an OFF time $T_{OFF}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus capable of improving power factor of a power supply powered by a high power line and a ground power line, wherein the power supply comprises a power switch, the apparatus comprising:
    a line voltage detector, for providing a scaled voltage to represent a line voltage of the high power line; and
    an ON time controller, comprising:
        a valley voltage detector, for providing, in response to the scaled voltage, a valley representative representing a valley voltage of the line voltage;
    wherein the ON time controller controls an ON time of the power switch in response to the valley representative; and
    wherein when the valley voltage increases the valley representative makes the ON time increase.

2. The apparatus as claimed in claim 1, wherein when the line voltage increases the scaled voltage makes the ON time decrease.

3. The apparatus as claimed in claim 2, the ON time controller comprises:
    a ramp generator for providing a ramp voltage with a slope, wherein during the ON time the ramp generator determines the slope in response to the valley representative and the scaled voltage.

4. The apparatus as claimed in claim 3, the ON time controller comprises:
    an operational amplifier for providing a compensation voltage in response to the difference between a feedback voltage and a target voltage, where the feedback voltage corresponds to an output voltage of the power supply.

5. The apparatus as claimed in claim 4, wherein the ON time controller further comprises a comparator comparing the compensation voltage with the ramp voltage to end the ON time.

6. The apparatus as claimed in claim 3, the ramp generator comprises:
    a capacitor;
    a main constant current source, for providing a constant charging current to charge the capacitor; and
    a supplemental current source, for providing a supplemental current in response to the scaled voltage and the valley representative to further charge the capacitor;
    wherein the voltage at the capacitor provides the ramp voltage, thereby the slope of the ramp voltage is in response to the scaled voltage and the valley representative.

7. The apparatus as claimed in claim 1, wherein the power supply comprises an inductive device connect in series with the power switch between the high power line and the ground power line, and the apparatus further comprises:
    a de-energization detector, for providing, in response to a discharge time of the inductive device, an end signal to start the ON time.

8. The apparatus as claimed in claim 7, wherein the inductive device is a transformer with a primary winding and an auxiliary winding, and the de-energization detector is coupled to the auxiliary winding.

9. The apparatus as claimed in claim 7, wherein both the de-energization detector and the line voltage detector are coupled to the auxiliary winding.

10. The apparatus as claimed in claim 1, wherein the valley voltage detector comprises:
    a counter for generating a count;
    a digital-to-analog converter, for providing the valley representative in response to the count; and
    a comparator, for comparing the valley representative with the scaled voltage to control the counter.

11. The apparatus as claimed in claim 10, wherein the count is updated once every period of time not less than 8 ms.

12. The apparatus as claimed in claim 1, wherein the power supply has a flyback topology or a booster topology.

13. A control method for improving a power factor of a power supply powered by a high power line and a ground power line, wherein the power supply comprises a power switch, the control method comprising:
    providing a scaled voltage representing a line voltage of the high power line;
    providing, in response to the scaled voltage, a valley representative representing a valley voltage of the line voltage;
    controlling an ON time of the power switch in response to the scaled voltage and the valley representative;
    when the line voltage increases, decreasing the ON time in response to the scaled voltage; and
    when the valley voltage increases, increasing the ON time in response to the valley representative.

14. The control method as claimed in claim 13, comprising:
    generating a ramp voltage with a slope;
    during the ON time, determining the slope in response to the scaled voltage and the valley representative; and
    determining the ON time in response to the ramp voltage and an compensation Voltage.

15. The control method as claimed in claim 14, comprising:
    generating the compensation voltage in response to a difference between a feedback voltage and a target voltage;
    wherein the feedback voltage corresponds to an output voltage of the power supply.

16. The control method as claimed in claim 13, wherein the power supply comprises an inductive device, the control method comprises:

detecting a discharge time of the inductive device to start the ON time.

17. The control method as claimed in claim 16, wherein the inductive device is a transformer with a primary winding and an auxiliary winding, and the primary winding is connected in series with the power switch between the high power line and the ground power line, the control method comprises:

detecting a discharge time via the auxiliary winding.

18. The control method as claimed in claim 17, comprising:

providing the scaled voltage by detecting the line voltage via the auxiliary winding.

19. The control method as claimed in claim 13, comprising:

providing a count using a counter;
  digital-to-analog converting the count into the valley representative; and
  comparing the valley representative with the scaled voltage to control the counter and update the count.

20. The control method as claimed in claim 19, comprising:

updating the count once every period of time not less than 8 ms.

\* \* \* \* \*